United States Patent
Gordon et al.

(10) Patent No.: US 8,397,639 B2
(45) Date of Patent: Mar. 19, 2013

(54) INITIATOR WITH MOLDED ESD DISSIPATER

(75) Inventors: Scott C. Gordon, Hyde Park, UT (US); Jeffrey T. Kida, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 55 days.

(21) Appl. No.: 13/082,451

(22) Filed: Apr. 8, 2011

(65) Prior Publication Data

US 2012/0256406 A1 Oct. 11, 2012

(51) Int. Cl.
*F42B 3/10* (2006.01)

(52) U.S. Cl. ............. 102/202.5; 102/202.2; 102/202.12; 280/741; 264/255

(58) Field of Classification Search .. 102/202.1–202.12; 280/741; 264/255
See application file for complete search history.

(56) References Cited

U.S. PATENT DOCUMENTS

| | | | | |
|---|---|---|---|---|
| 3,264,989 A | * | 8/1966 | Rucker | 361/248 |
| 4,530,516 A | * | 7/1985 | Adams et al. | 280/741 |
| 4,690,063 A | * | 9/1987 | Granier et al. | 102/530 |
| 4,745,858 A | | 5/1988 | Harder | |
| 5,131,679 A | | 7/1992 | Novak et al. | |
| 5,337,674 A | * | 8/1994 | Harris et al. | 102/530 |
| 5,462,448 A | * | 10/1995 | Kida et al. | 439/357 |
| 5,648,634 A | * | 7/1997 | Avory et al. | 102/202.1 |
| 5,763,814 A | * | 6/1998 | Avory et al. | 102/202.7 |
| 5,932,832 A | * | 8/1999 | Hansen et al. | 102/202.4 |
| 6,234,534 B1 | | 5/2001 | Warren | |
| 6,979,021 B2 | | 12/2005 | Young et al. | |
| 7,210,703 B2 | | 5/2007 | Young et al. | |
| 7,338,623 B2 | | 3/2008 | Torii | |
| 8,234,034 B2 | * | 7/2012 | Brisighella et al. | 701/29.1 |
| 2002/0174792 A1 | * | 11/2002 | Kubozuka et al. | 102/202.12 |
| 2005/0039624 A1 | | 2/2005 | Furusawa et al. | |
| 2010/0332074 A1 | * | 12/2010 | Brisighella et al. | 701/33 |
| 2012/0239225 A1 | * | 9/2012 | Brisighella et al. | 701/2 |

* cited by examiner

*Primary Examiner* — Michael David
(74) *Attorney, Agent, or Firm* — Harness, Dickey & Pierce, P.L.C.

(57) ABSTRACT

An initiator assembly can include an outer body can have a first end, a second end, and an internal passage between the first and second ends. An initiator canister can be joined to the outer body at the first end and can define a charge chamber that includes a pair of pins extending therefrom. An insulative material can be molded within the passage to form an insulative structural member that joins the canister and pins to the outer body and insulates the pins and a portion of the canister from electrical contact with the outer body. An electrostatic discharge dissipater can be formed from an electrically conductive material and can be molded to the canister and the outer body at the first end. The dissipater can electrically connect the canister to the outer body to provide a controlled dissipation path for electrostatic discharge energy carried by the initiator assembly.

23 Claims, 3 Drawing Sheets

INITIATOR WITH MOLDED ESD DISSIPATER

FIELD

The present disclosure relates generally to an initiator, and more particularly to an initiator with a molded electrostatic discharge dissipater.

BACKGROUND

This section provides background information related to the present disclosure that is not necessarily prior art.

Inflators for inflating an air bag or other inflatable restraint in a vehicle typically include an initiator device for igniting a gas generant material that is contained in the inflator. The initiator device can include a pyrotechnic device configured to ignite the gas generant material upon actuation. Such an initiator device can be inherently sensitive to electrostatic discharge (ESD) energy, which is a product of triboelectric charging that can occur naturally in a vehicle interior, as is known in the art. As a result, various design approaches have been implemented to mitigate such ESD energy in an effort to ensure that such energy does not affect the functionality of the initiator device.

Two common design approaches include the use of a defined spark gap or a varistor. One drawback of the defined spark gap approach is that the initiator must be designed to include a specifically toleranced air gap, which is often difficult due to initiator design and packaging constraints. In addition, the defined spark gap approach typically results in an abrupt discharge of stored ESD energy once the ESD energy reaches the breakdown voltage potential of air. Regarding the use of varistors, they are discrete purchased components that require additional processing during manufacturing of the initiator device, as well as are often not feasible due to cost constraints.

Thus, while initiator devices with defined spark gaps or varistors work for their intended purpose, there remains a need for continuous improvement in the relevant art.

SUMMARY

This section provides a general summary of the disclosure, and is not a comprehensive disclosure of its full scope or all of its features.

In one form, an initiator assembly is provided in accordance with the teachings of the present disclosure. The initiator assembly can include an outer body, an initiator canister, an insulative structural member and an electrostatic discharge dissipater. The outer body can have a first end, an opposite second end, and can form an internal passage between the first and second ends. The initiator canister can be joined to the outer body at the first end. The initiator canister can define a charge chamber having a reactive charge disposed therein and can include a pair of electrically conductive pins extending therefrom. An insulative material can be molded within the internal passage to form the insulative structural member that joins the initiator canister and pins to the outer body. The insulative material can insulate the pins and a portion of the initiator canister from electrical contact with the outer body. The electrostatic discharge dissipater can be formed from an electrically conductive material and can be molded to the initiator canister and the outer body at the first end. The electrostatic discharge dissipater can electrically connect the initiator canister to the outer body to provide a controlled dissipation path for electrostatic discharge energy carried by the initiator assembly.

In another form, an initiator assembly is provided in accordance with the teachings of the present disclosure. The initiator assembly can include a conductive outer body, an initiator canister, an insulative structural member and an electrostatic discharge dissipater. The conductive outer body can have a first end, an opposite second end, and can form an internal passage between the first and second ends. The initiator canister can have an open end joined to the outer body at the first end. The initiator canister can define a charge chamber having a reactive charge disposed therein and can include a pair of electrically conductive pins extending therefrom. An insulative material can be molded within the internal passage to form the insulative structural member joining the initiator canister and pins to the outer body. The insulative material can surround the initiator canister and can insulate the pins and a portion of the initiator canister from electrical contact with the outer body. The electrostatic discharge dissipater can be formed from an electrically conductive material and can be molded to the open end of the initiator canister and the outer body at the first end. The electrostatic discharge dissipater can encapsulate a portion of the initiator canister and can electrically connect the initiator canister to the outer body to provide a controlled dissipation path for electrostatic discharge energy carried by the initiator assembly.

In yet another form, a method of forming an initiator assembly is provided in accordance with the teachings of the present disclosure. The method can include injecting a first material into a mold with a first shot of a two shot injection molding process to form an insulative structural member integrally molded to an outer body and joining an initiator canister and initiator pins extending therefrom to the outer body. A portion of the initiator pins and an open end of the initiator canister can be encapsulated with the first material to electrically insulate the pins and a portion of the initiator canister from the outer body. The method can further include injecting a second material different from the first material with a second shot of the two shot molding process into the mold to form an electrostatic discharge dissipater integrally molded to the initiator canister and the outer body. The electrostatic discharge dissipater can form a controlled dissipation path from the initiator canister to the outer body for dissipation of electrostatic discharge energy carried by the initiator assembly.

Further areas of applicability will become apparent from the description provided herein. The description and specific examples in this summary are intended for purposes of illustration only and are not intended to limit the scope of the present disclosure.

DRAWINGS

The present teachings will become more fully understood from the detailed description, the appended claims and the following drawings. The drawings are for illustrative purposes only of selected embodiments and not all possible limitations, and are not intended to limit the scope of the present disclosure.

DETAILED DESCRIPTION

Figures 1, 2:
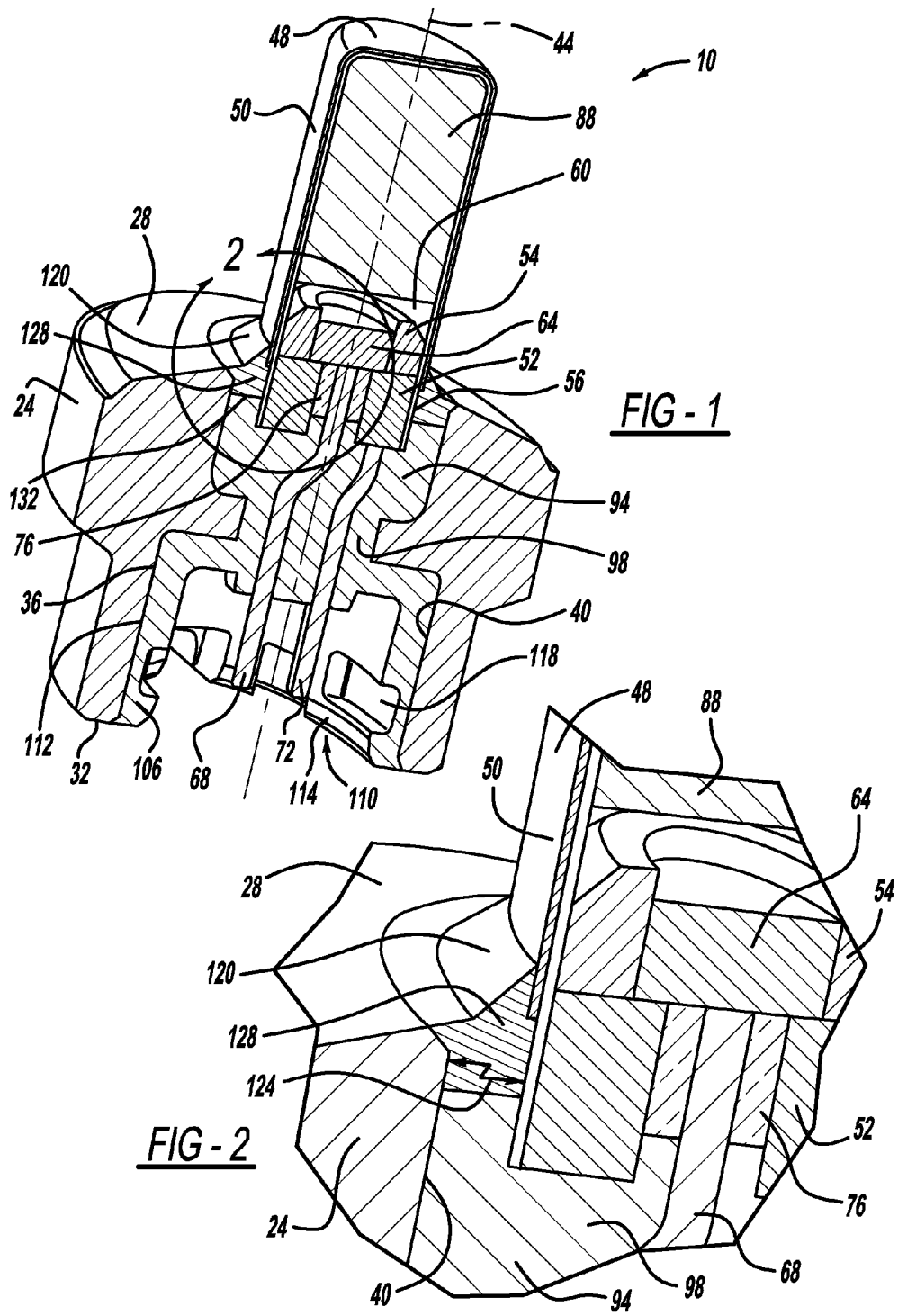
FIG. 1 is a perspective view of an exemplary integral initiator assembly in accordance with the teachings of the present disclosure.
FIG. 2 is an enlarged view of a portion of the integral initiator assembly of FIG. 1 in accordance with the teachings of the present disclosure.

The following description is merely exemplary in nature and is not intended to limit the present disclosure, its application, or uses. It should be understood that throughout the several views of the drawings, corresponding reference numerals indicate like or corresponding parts and features with the various elements in each view being drawn to scale.

Throughout the description, exemplary embodiments are provided so that this disclosure will be thorough, and will fully convey the scope to those who are skilled in the art. Numerous specific details are set forth such as examples of specific components, devices, systems and/or methods, to provide a thorough understanding of exemplary embodiments of the present disclosure. It will be apparent to those skilled in the art that specific details need not be employed, that exemplary embodiments may be embodied in many different forms and that neither should be construed to limit the scope of the disclosure. In some exemplary embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
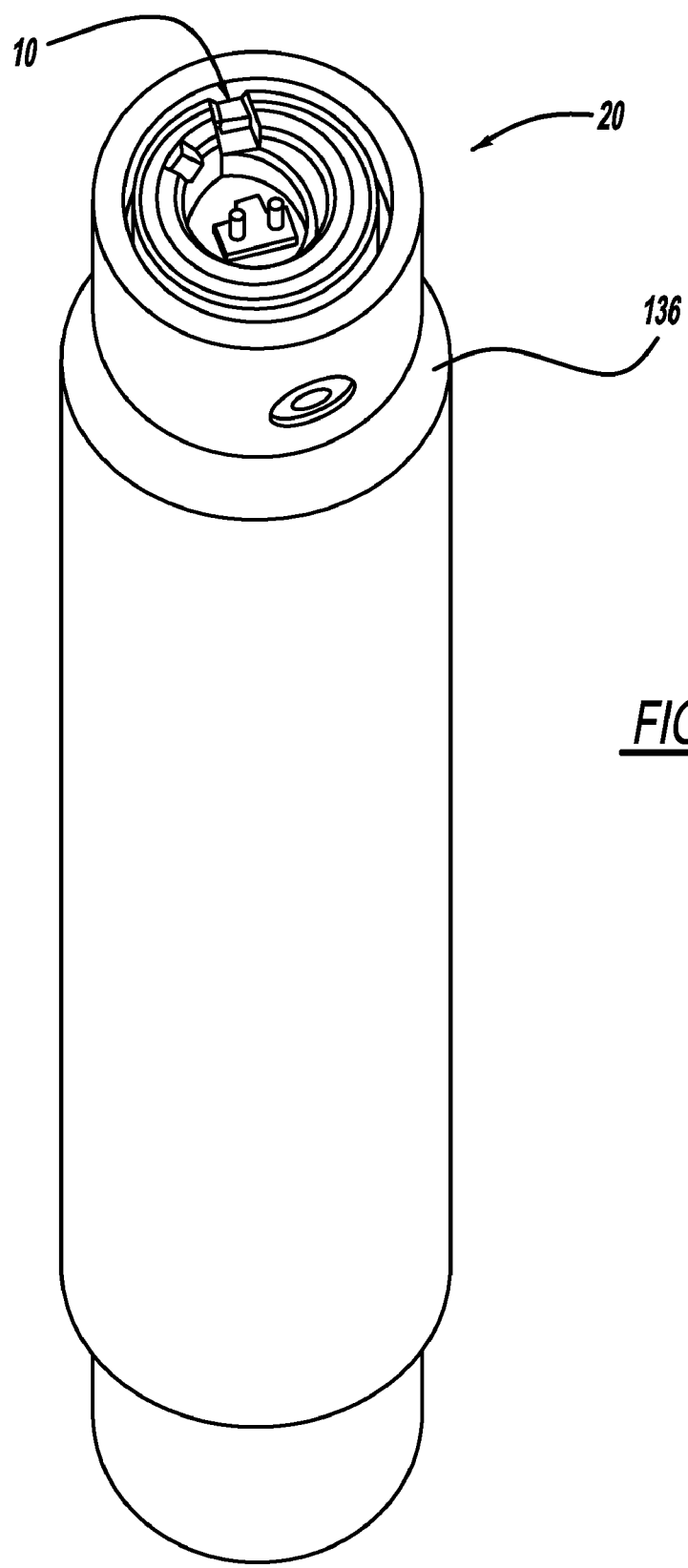
FIG. 3 is a perspective view of an exemplary inflator assembly incorporating the integral initiator assembly of FIG. 1 in accordance with the teachings of the present disclosure.

With reference to FIGS. 1-3, an exemplary integral initiator assembly 10 is provided in accordance with the teachings of the present disclosure. The integral initiator assembly 10 can include an integrally molded electrostatic discharge (ESD) dissipater that can be customizable in its geometry for use in a specific application, such as an air bag inflator assembly 20 (FIG. 3). Although the following description is related generally to an integral initiator assembly 10 for the inflator assembly 20, it will be appreciated that the integral initiator assembly 10 discussed herein can be applicable to other assemblies and/or systems including, but not limited to, a seat belt pretensioner. Further, it will be understood that the inflator assembly 20 discussed herein can be used with various inflatable restraint installations including driver, passenger and side impact restraint installations for various automotive vehicles.

As will be discussed in greater detail below, the integral initiator assembly 10 can provide a cost savings over conventional initiator devices while also being formed with an integrally molded ESD dissipater. The integral initiator assembly 10 with the molded ESD dissipater can be formed using a two shot injection molding process, thereby reducing processing time and complexity associated with manufacturing the integral initiator assembly 10, as will also be discussed below.

The integral initiator assembly 10 can include an outer collar body 24 having a first end portion 28 and a second end portion 32 opposite the first end portion 28. The collar body 24 can form an internal passage 36 defined by an inner wall 40 extending from the first end portion 28 to the second end portion 32. As will be appreciated by those skilled in the art, the collar body 24 can have any suitable size and shape depending upon the desired configuration of the inflator or higher assembly 20 in which the initiator assembly 10 will be used. The collar body 24 can be rigid and can be formed of any suitable material that is conductive, such as for example, metal. As shown in FIG. 1, the collar body 24 can include a generally cylindrical shape and can be generally positioned about a longitudinal axis 44 of the initiator assembly 10. The passage 36 can have any suitable size and/or shape that can facilitate the unification of initiator assembly components with the collar body 24, as will be discussed in greater detail below.

With particular reference to FIG. 1, an initiator canister 48 can be joined to an eyelet 52 and a charge holder 54 at an open end portion 56. The initiator canister 48 can extend outwardly from the first end portion 28 along longitudinal axis 44. The initiator canister 48 can form or define a charge chamber 60 therein and can include an outside surface 50 with at least a portion of the outside surface 50 separated or spaced apart from inner wall 40 of collar body 24. The charge chamber 60 can include at least one actuatable reactive charge material 64 surrounded by the charge holder 54 that, upon actuation, can produce reaction products such as gas and/or heat. The initiator canister 48 can be made of materials known in the art, such as metal, and formed such that it can be ruptured by the discharged reaction products of the actuated reactive charge 64. In an exemplary configuration, the initiator canister 48 can be ruptured by the reactive charge 64 directly, for example, by an exothermic reaction of the reactive charge 64 within the charge chamber 60.

Typically, known inflator initiators include at least one electrical terminal, often a conductive pin, for electrical contact with an associated electrical connector and are designed to receive an electrical signal therefrom. In the exemplary integral initiator assembly 10 of FIG. 1, the initiator canister 48 can include a pair of electrical terminals, shown as first and second electrical conductive pins 68 and 72, respectively, in actuating communication with the reactive charge 64. The electrical conductive pins 68 and 72 are in actuating communication with the reactive charge 64 when the conductive pins 68 and 72 are able to initiate reaction of the reactive charge 64 upon receiving an electrical signal from an associated electrical connector (not shown). In one exemplary configuration, the charge holder 54 can include an annular groove configured to receive a portion of the reactive charge 64 therein. The reactive charge 64 can include one or more known reactive charge materials that can be actuated by an electrical current introduced through conductive pins 68 and 72. Examples of reactive charges known in the art include mixtures having zirconium and potassium perchlorate (ZPP), for example.

As shown in FIG. 1, the first conductive pin 68 can be coupled to the initiator canister 48 with one end positioned within the eyelet 52 and an opposite end toward the second end portion 32 of collar body 24. An insulating material 76 within the eyelet 52 can be used to separate and insulate the first conductive pin 68 from the eyelet 52. The second conductive pin 72, separate from the first conductive pin 68, can be attached directly to the eyelet 52. As is known in the art, a bridgewire (not shown) can be used to connect the first conductive pin 68 to the eyelet 52 when the insulating material 76 is present, thereby closing a circuit between the first conductive pin 68 and the second conductive pin 72. As will be appreciated, various electrical terminal configurations known in the art can be used with the integral initiator assembly 10 of the present disclosure.

In an exemplary configuration of the integral initiator assembly 10, a gas generant material 88 can be contained within the charge chamber 60 in addition to the reactive charge 64. The gas generant material 88 can be actuated by the reaction of the reactive charge 64, and not directly by the electrical current from the conductive pins 68 and 72, to produce a gas. Gas generant materials for use with integral initiator assembly 10 can be provided in various forms including wafer, pellet and grain forms, for example. Exemplary gas generant materials for use with initiator assembly 10 can include or contain a combustible fuel and oxidizer combination. In one configuration, the fuel can include an organic compound that is rich in nitrogen and oxygen content as such fuel materials can desirably reduce the amount of oxidizer required for combustion thereof.

In the configuration shown in FIG. 1, an insulative material 94 can join the initiator canister 48 to the collar body 24 to form the integrally molded initiator assembly 10. In one exemplary configuration, the insulative material 94 can be applied to components of the initiator assembly 10 by a first shot of a two shot injection molding process used to form the integrally molded initiator assembly 10, as will be discussed below in greater detail. The insulative material 94 can be disposed between the inner wall 40 of collar body 24 and at least a portion of the initiator canister 48 and/or eyelet 52 to firmly secure the initiator canister 48 and eyelet 52 to collar body 24 to form an isulative structural member 98, as shown for example in FIG. 1. In addition, the insulative material 94 can be an electrically isulative material to electrically insulate and/or isolate the initiator canister 48, including eyelet 52 and pins 68, 72, from unintended electrical contact with collar body 24.

The insulative material 94 can be disposed within the passage 36 using any suitable method or process, including the two shot injection molding process briefly discussed above. When using the injection molding process, the insulative material 94 can be injected as a liquid or flowable material into the passage 36 and about the inner wall 40 of collar body 24 and at least a portion of the initiator canister 48 and eyelet 52 to form the insulative structural member 98. When the injection molded insulative material 94 solidifies, the initiator canister 48, eyelet 52 and associated pins 68, 72 can be fixedly held or secured to the collar body 24 via insulative structural member 98, as shown in FIG. 1.

Those skilled in the art and guided by the teachings herein will appreciate that the insulative material 94 can be formed from a variety of materials including various thermoplastic or similar compositions know in the art that are conducive to processing via injection molding and are well suited for providing electrical insulation. In general, properties or conditions that can be important in the selection of an appropriate material for use in such an application include: tensile and impact strength, electrical insulating properties or characteristics, as well as having a melt temperature lower than the autoignition temperature of the associated reactive charge material. Glass-reinforced nylon is an exemplary material that can be used as the insulative material 94 to form the insulative structural member 98. Examples of other suitable materials that can be used in such an application include glass-reinforced polyester, glass-reinforced polyetherimide and other thermoplastic materials known in the art.

As shown in FIG. 1, the integral initiator assembly 10 can include a mating interface portion 106 at the second end portion 32. In one exemplary configuration, the mating interface portion 106 can be formed as a portion of the isulative structural member 98 during the first shot of the two shot injection molding process. The mating interface portion 106 can include at least a portion of the conductive pins 68, 72 and can include a customizable attachment configuration 110 sized and shaped to provide for connection of the integrally molded initiator assembly 10 to an associated electrical connector (not shown). In this regard, the mating interface portion 106 can be customized to match various configurations of electrical connectors. For example, the mating interface portion 106 can cover an inside area 112 of passage 36 at the second end portion 32 and define interface attachment features, such as a retaining shoulder 114 and/or recessed pocket 118 sized and shaped to hold the electrical connector securely in and to the mating interface portion 106.

In the exemplary configuration shown in FIGS. 1 and 2, the integrally molded initiator assembly 10 can include a molded dissipater member 120 configured to provide a controlled dissipation path for ESD energy. The molded dissipater member 120 can be formed using any suitable process, including the two shot injection molding process discussed above. In this regard, molded dissipater member 120 can be formed using a second shot of the two shot injection molding process and can be customizable in size and shape for use in a variety of initiator devices or other higher end assemblies.

Molded dissipater member 120 can be positioned relative to the first end portion of collar body 24 and radially between the initiator canister 48 and the collar body 24, as shown in FIGS. 1 and 2. In the exemplary configuration illustrated, molded dissipater member 120 can encapsulate the open end portion 56 of initiator canister 48 and extend radially outward to conductive collar body 24. In one form, molded dissipater member 120 can be molded into an annular recessed area 132 between initiator canister 48 and collar body 24. As initiator canister 48 can be in direct contact with eyelet 52, molded dissipater member 120 can provide a direct dissipation path 124 from initiator canister 48, as well as the associated eyelet 52 and at least one of the conductive pins 68, 72.

An electrically conductive material 128 can be used for the molded dissipater member 120 to provide the direct, controlled dissipation path 124 for the ESD energy or charge that can build up and/or be carried by integral initiator assembly 10. The molded dissipater member 120 formed with the electrically conductive material 128 can direct ESD energy away from the pyrotechnic materials in initiator canister 48 and to the conductive collar body 24 and intended ground. In this regard, at least a portion of the molded dissipater member 120 can be positioned axially between the reactive charge 64 and the collar body 24, as shown for example in FIG. 1. In addition, the molded dissipater member 120 can also direct ESD energy from a charged higher assembly, such as an inflator body, to the ground pin 72 of the of the integrally molded initiator assembly 10 in a controlled manner. For example, the ESD energy can be directed from the higher potential inflator body to ground pin 72 via the electrically conductive material 128 in contact with the eyelet 52.

In one exemplary configuration, the electrically conductive material 128 can include a plastic resin material with a lower surface resistivity in the range of between approximately $10^3$ to $10^9$ ohms as compared to the generally insulative properties of typical engineered plastics that have a surface resistivity in the range of $10^{14}$ to $10^{18}$ ohms. As one of ordinary skill in the art will appreciate, low surface resistivity can be a desired material property where static electricity dissipation is required. Decreased surface resistivity, and thus increased conductivity, can be imparted to plastic materials by using additives such as carbon, carbon fiber, or stainless steel fiber. The amount of conductive additive material imparted to the plastic material or resin can be selectively controlled to create a desired conductivity of the molded dissipater member 120 to form the controlled dissipation path 124 for the ESD energy. In this regard, the electrically conductive material can include a conductivity high enough to slowly dissipate the ESD energy to ground while being insulative enough to otherwise prevent an unintended current leakage path.

With additional reference to FIG. 3, the integrally molded initiator assembly 10 can be assembled into a higher assembly, such as the illustrated air bag inflator assembly 20. In the inflator assembly 20, the conductive metal collar body 24 can be in direct contact with a housing 136 of the inflator assembly 20, which can be connected to electrical ground. For example, inflator assembly 20 can be attached to a vehicle in connection with an air bag assembly (not shown), which would provide a dissipative path for the ESD energy from the integral initiator assembly 10 to the inflator assembly 20 and then to an intended ground, such as vehicle ground in this example.

Figure 4:
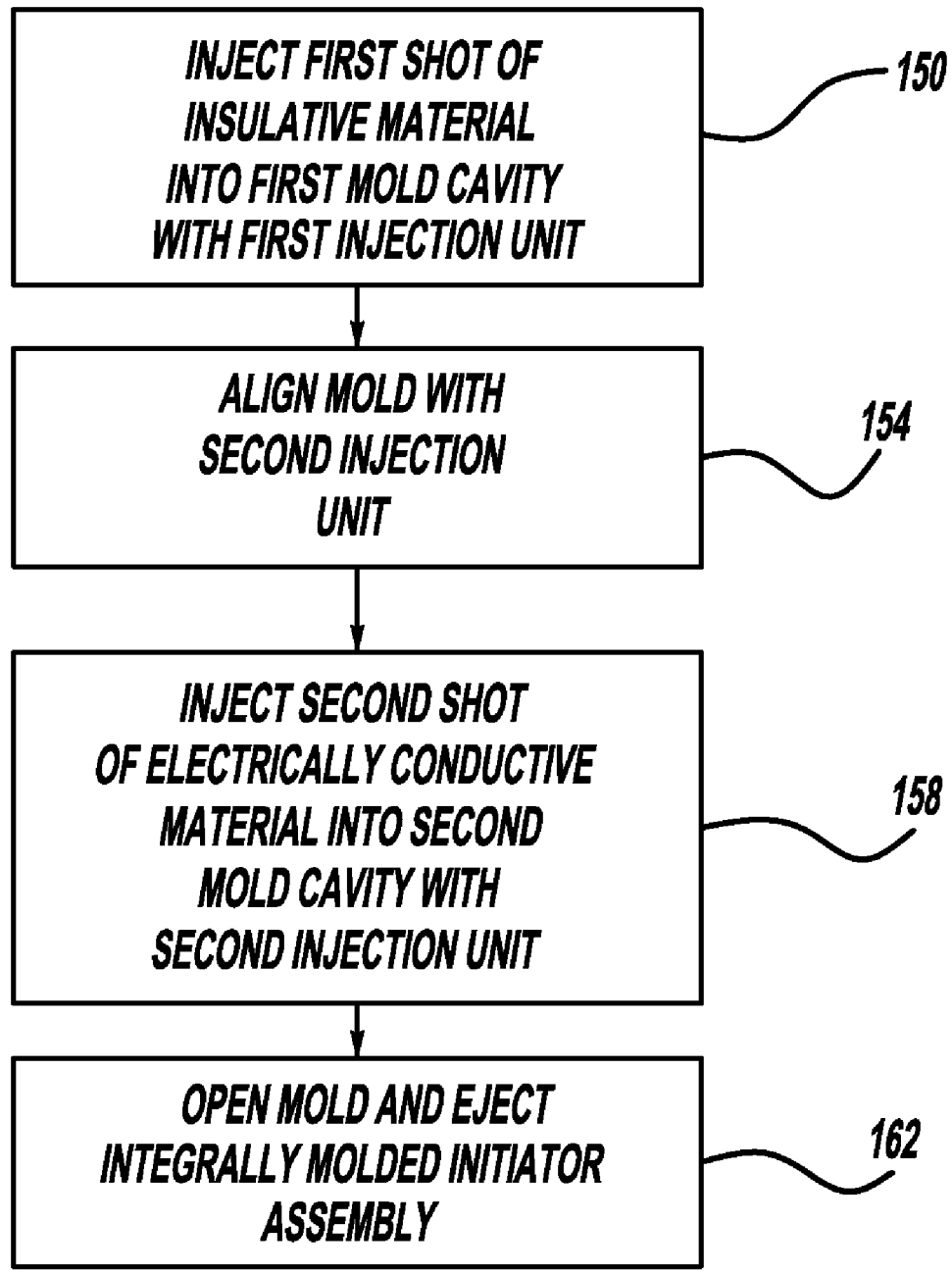
FIG. 4 is a flowchart depicting an exemplary process for forming the integral initiator assembly of FIG. 1 in accordance with the teachings of the present disclosure.

As briefly discussed above and with additional reference to FIG. 4, the two shot injection molding process can be used to form the integral initiator assembly 10. The two shot injection molding process can utilize a two cavity mold and an injection molding machine having first and second independent injection units, each of which can shoot a different material into a respective cavity of the mold, as is known in the art. The two shot injection molding process provides for being able to use two different resin materials (e.g., the insulative material 94 and the electrically conductive material 128) in first and second shots within the same mold tooling. This can provide for producing the integral initiator assembly 10 at a lower cost and in a more dimensionally consistent manner, as will be discussed in greater detail below.

For example, in the first shot of the two shot molding process, the insulative material 94 can be injected via the first injection unit into the first cavity of the mold at block 150 and flow relative to the collar body 24 and initiator canister 48 with the eyelet 52 and pins 68, 72 extending therefrom. The first shot of the injected insulative material 94 can form the isulative structural member 98 with mating interface portion 106 about the collar body 24, pins 68, 72, eyelet 52 and initiator canister 48, as discussed above and shown in FIG. 1. While the insulative material 94 is being injected into the first cavity, the mold volume to be occupied by the second shot (i.e., the electrically conductive material 128) can be shut off from the first injection unit.

Once the insulative material 94 has been injected in the first shot, the mold can be opened and rotated, such as 180 degrees, and then aligned with the second injection unit at block 154. The mold can then be closed and the second shot of electrically conductive material 128 can be injected into the second cavity to form the molded dissipater member 120 at block 158. After sufficient cooling, the mold can be opened and the integrally molded initiator assembly 10 can be ejected therefrom at block 162.

In one exemplary configuration, the two shot injection molding process can be accomplished with an indexing system, such as a round table, with first and second stations having the respective first and second injection units. In this configuration, the first shot can be injected into the first cavity at the first station. The mold can then be opened and rotated 180 degrees as discussed above while the table is indexing to align the mold with the second station. The second shot can then be injected into the second cavity, as discussed above.

Thus, by using the two shot injection molding process, both the insulative material 94 and the electrically conductive material 128 can be used with the same tooling in the same cycle to form the integrally molded initiator assembly 10. The process provides for eliminating a need for separate tooling for the different resin materials, which can create additional tolerance stack-ups and thus less dimensional consistency. The two shot injection molding process can also reduce the cost of manufacturing such an initiator assembly by eliminating a need for an operator to work the mold tooling and handle the parts between the first and second shots. The integral initiator assembly 10 can also include enhanced strength properties due to the integrally molded nature of each of its components. Further, the molded dissipater member 120 provides for a continuous controlled dissipation path for ESD energy from a high potential source to ground as compared to the more abrupt discharge experienced in a conventional initiator with a spark gap design when the ESD energy reaches the breakdown voltage potential of air and discharges all at once through the air gap.

While one or more specific examples have been described and illustrated, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof.

What is claimed is:

1. An initiator assembly comprising:
   an outer body having a first end, an opposite second end, and forming an internal passage between the first and second ends;
   an initiator canister joined to the outer body at the first end, the initiator canister defining a charge chamber having a reactive charge disposed therein and including a pair of electrically conductive pins extending therefrom;
   an insulative material molded within the internal passage to form an insulative structural member joining the initiator canister and pins to the outer body, the insulative material insulating the pins and a portion of the initiator canister from electrical contact with the outer body; and
   an electrostatic discharge dissipater formed from an electrically conductive material and molded to the initiator canister and the outer body at the first end, the electrostatic discharge dissipater electrically connecting the initiator canister to the outer body to provide a controlled dissipation path for electrostatic discharge energy carried by the initiator assembly.

2. The initiator assembly of claim 1, wherein the electrostatic discharge dissipater is integrally molded to the outer body, initiator canister and insulative structural member at the first end.

3. The initiator assembly of claim 1, wherein the initiator canister is spaced apart from the outer body and the electrostatic discharge dissipater extends radially outward from the initiator canister to the outer body.

4. The initiator assembly of claim 1, wherein the electrostatic discharge dissipater encapsulates the initiator canister proximate an open end of the initiator canister that is joined to the outer body by the insulative structural member.

5. The initiator assembly of claim 4, wherein the insulative structural member encapsulates the open end of the initiator canister between the electrostatic discharge dissipater and the second end of the outer body.

6. The initiator assembly of claim 1, wherein the electrically conductive material includes a surface resistivity of between $10^3$ and $10^9$ ohms.

7. The initiator assembly of claim 1, wherein the outer body includes an electrically conductive outer body.

8. The initiator assembly of claim 1, wherein the initiator assembly includes an annular recess at the first end of the outer body, the annular recess defined by the outer body, the insulative structure member and the initiator canister, the electrostatic discharge dissipater being molded into the annular recess.

9. The initiator assembly of claim 1, wherein the initiator assembly is formed using a two shot injection molding process with the insulative structural member being formed from the insulative material injected in a first shot of the molding process and the electrostatic discharge dissipater being formed from the electrically conductive material in a second shot of the two shot injection molding process, the insulative structural member and the electrostatic discharge dissipater being integrally molded to the outer body and to each other.

10. An initiator assembly comprising:
    a conductive outer body having a first end, an opposite second end, and forming an internal passage between the first and second ends;
    an initiator canister having an open end joined to the outer body at the first end, the initiator canister defining a charge chamber having a reactive charge disposed therein and including a pair of electrically conductive pins extending therefrom;
    an insulative material molded within the internal passage to form an insulative structural member joining the initiator canister and pins to the outer body, the insulative material surrounding the initiator canister and insulating the pins and a portion of the initiator canister from electrical contact with the outer body; and
    an electrostatic discharge dissipater formed from an electrically conductive material and molded to the open end of the initiator canister and the outer body at the first end, the electrostatic discharge dissipater encapsulating a portion of the initiator canister and electrically connecting the initiator canister to the outer body to provide a controlled dissipation path for electrostatic discharge energy carried by the initiator assembly.

11. The initiator assembly of claim 10, wherein at least a portion of the electrostatic discharge dissipater is positioned axially between the reactive charge and the outer body to direct the electrostatic discharge energy away from the reactive charge and to the conductive outer body.

12. The initiator assembly of claim 10, wherein one of the pair of electrically conductive pins is a ground pin; and
    wherein at least a portion of the electrostatic discharge dissipater is positioned axially between the reactive charge and the outer body to provide a path for electrostatic discharge energy from an associated higher assembly to the ground pin.

13. The initiator assembly of claim 10, wherein the insulative structural member is integrally molded to the outer body, the initiator canister and the pins, and wherein the electrostatic discharge dissipater is integrally molded to the outer body, initiator canister and insulative structural member.

14. The initiator assembly of claim 10, further comprising an annular recess positioned between a portion of the initiator canister adjacent the open end and the first end of the outer body, the annular recess defined by the outer body, the insulative structural member and the initiator canister;
    wherein the electrostatic discharge dissipater is molded in the annular recess.

15. The initiator assembly of claim 10, wherein the electrically conductive material includes a surface resistivity of between $10^3$ and $10^9$ ohms.

16. The initiator canister of claim 10, wherein the initiator canister is spaced apart from the outer body and the electrostatic discharge dissipater extends radially outward from the initiator canister to the outer body.

17. The initiator assembly of claim 10, further comprising an inflator adapted to be connected to an electrical ground, the initiator assembly being received in a housing of the inflator such that the conductive outer body engages the housing, the initiator assembly providing the controlled dissipation path for electrostatic discharge energy carried by the initiator assembly to the electrical ground via the electrostatic discharge dissipater and the conductive outer body.

18. The initiator assembly of claim 17, wherein one of the pair of electrically conductive pins is a ground pin; and wherein the initiator assembly provides the controlled dissipation path for electrostatic discharge energy from the conductive outer body to the ground pin.

19. A method for forming an initiator assembly comprising:
- injecting a first material into a mold with a first shot of a two shot injection molding process to form an insulative structural member integrally molded to an outer body and joining an initiator canister and initiator pins extending therefrom to the outer body;
- encapsulating a portion of the initiator pins and an open end of the initiator canister with the first material to electrically insulate the pins and a portion of the initiator canister from the outer body; and
- injecting a second material different from the first material with a second shot of the two shot molding process into the mold to form an electrostatic discharge dissipater integrally molded to the initiator canister and the outer body;
- wherein the electrostatic discharge dissipater forms a controlled dissipation path from the initiator canister to the outer body for dissipation of electrostatic discharge energy carried by the initiator assembly.

20. The method of claim 19, wherein the first material includes an electrically isolative material and the second material includes an electrically conductive material having a surface resistivity between $10^3$ and $10^9$ ohms.

21. The method of claim 19, wherein the outer body includes a conductive outer body adapted to facilitate a connection to electrical ground.

22. The method of claim 19, wherein injecting a second material different from the first material with a second shot of the two shot molding process into the mold to form an electrostatic discharge dissipater integrally molded to the initiator canister and the outer body includes encapsulating a portion of the initiator canister with the second material proximate the open end.

23. The method of claim 22, further comprising forming the electrostatic discharge dissipater to extend radially outward from the initiator canister directly to the outer body, the electrostatic discharge dissipater being integrally molded to the initiator canister, the insulative structural member and the outer body.

* * * * *